(12) United States Patent
Elg

(10) Patent No.: US 6,694,354 B1
(45) Date of Patent: Feb. 17, 2004

(54) HOST COMPUTER ACCESS TO PERIPHERAL DEVICE DRIVERS

(75) Inventor: Johannes Elg, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/388,499

(22) Filed: Sep. 1, 1999

Related U.S. Application Data
(60) Provisional application No. 60/110,226, filed on Nov. 30, 1998.

(51) Int. Cl.[7] .............................................. G06F 15/16
(52) U.S. Cl. .................. 709/217; 709/219; 709/226; 709/245; 709/246; 709/321; 717/178; 710/8
(58) Field of Search ................. 709/217, 223, 709/225, 321, 720, 219, 226, 245, 246, 231; 717/178; 710/8; 707/3

(56) References Cited

U.S. PATENT DOCUMENTS

| | | | |
|---|---|---|---|
| 5,596,723 A | 1/1997 | Romohr ................. 395/200.16 |
| 5,655,148 A | 8/1997 | Richman et al. ............. 395/828 |
| 5,664,195 A | 9/1997 | Chatterji ..................... 395/712 |
| 5,748,980 A | 5/1998 | Lipe et al. ................... 395/828 |
| 5,862,325 A | 1/1999 | Reed et al. ............. 395/200.31 |
| 5,870,610 A | 2/1999 | Beyda ........................ 395/712 |
| 6,009,480 A | * 12/1999 | Pleso ........................ 709/321 |
| 6,012,103 A | * 1/2000 | Sartore et al. ................. 710/10 |
| 6,023,585 A | * 2/2000 | Perlman et al. ............. 717/178 |
| 6,094,679 A | * 7/2000 | Teng et al. ................. 709/220 |
| 6,148,346 A | * 11/2000 | Hanson ....................... 345/961 |
| 6,360,215 B1 | * 3/2002 | Judd et al. ....................... 707/3 |
| 6,393,492 B1 | * 5/2002 | Cornaby et al. ............. 709/321 |
| 6,421,069 B1 | * 7/2002 | Luktke et al. ............... 345/762 |
| 6,421,726 B1 | * 7/2002 | Kemmer et al. ............. 709/225 |
| 2001/0037382 A | * 4/1998 | Anttila ........................ 709/223 |

FOREIGN PATENT DOCUMENTS

| | | | |
|---|---|---|---|
| WO | WO 98-47074 | 10/1998 |
| WO | WO 98-50861 | * 11/1998 |
| WO | WO 99-06910 | 2/1999 |

* cited by examiner

*Primary Examiner*—Hosain Alam
*Assistant Examiner*—Oanh L Duong
(74) *Attorney, Agent, or Firm*—Jenkens & Gilchrist, P.C.

(57) ABSTRACT

A peripheral device is cooperable with a host computer to direct the host computer to device information stored at an external location accessible to the host computer via an external data path. The device information can then be automatically downloaded to the host computer for use in conjunction with the peripheral device.

16 Claims, 4 Drawing Sheets http://www.ericsson.com/drivers/*/SH888.BIN http://www.ericsson.com/drivers/Win98_x86/SH888.BIN file:/a:/Win98_x86/SH888.BIN http://www.ericsson.com/prodinfo/*/GH198.html http://www.ericsson.com/prodinfo/Win2000_x86/GH198.html

HOST COMPUTER ACCESS TO PERIPHERAL DEVICE DRIVERS

This application claims the priority under 35 USC 119(e)(1) of U.S. Provisional Application No. 60/110,226, filed on Nov. 30, 1998.

FIELD OF THE INVENTION

The invention relates generally to interfacing between host computer s and peripheral devices and, more particularly, to providing host computer access to peripheral device drivers.

BACKGROUND OF THE INVENTION

Conventionally, when a host computer such as a personal computer, engineering workstation, etc. is connected to a peripheral device such as a printer, monitor, or even a PCI or EISA card, the peripheral device identifies itself uniquely to the host computer so the host computer can then search for a device driver for use with that peripheral device. The term "device driver" conventionally refers to software that must be installed in the host computer in order to permit the host computer to use the features of the device. The host computer can use the unique identification received from the peripheral device to search for the appropriate driver on, e.g., a floppy disk, CD-ROM or within the operating system utilized by the host computer platform. Although the peripheral device uniquely identifies itself to the host computer, the peripheral device does not tell the host computer where to find the driver. The host's operating system needs some independent knowledge of suitable places to search for the driver. After the device driver is located and retrieved, the host computer can use the device driver to access the features of the peripheral device.

The aforementioned conventional technique of providing host computer access to a device driver associated with a connected peripheral device is often referred to as Plug-and-Play (PnP). Plug-and-Play assumes a specific driver for each device. Because drivers are by nature operation system-specific, Plug-and-Play does not promote interoperability. Although Plug-and-Play is typically adequate for use with peripheral devices such as EISA and PCI cards, Plug-and-Play's lack of interoperability presents a problem when, for example, the peripheral device is a wireless device such as a mobile telephone, that can move from one host computer to another and can connect to virtually any type of host computer, for example personal computers, personal digital assistants and Smartphones.

The conventional Plug-and-Play technique is not suitable for use with such highly mobile peripheral devices, because each of the various host computer platforms to which the mobile peripheral device can be connected must be able to locate and retrieve the device driver associated with the mobile peripheral device. Conventional Plug-and-Play typically assumes that the peripheral device will be accompanied by a suitable data storage medium (such as a floppy disk or a CD-ROM) when it is first connected/installed at the host computer, and that the host computer will be able to search for, locate and retrieve the device driver stored by that data storage medium. It is disadvantageous to require a user of a mobile peripheral device also to carry a storage medium (such as a floppy disk or CD-ROM) for use when connecting the mobile device to a given host computer.

It is therefore desirable to give a host computer access to a device driver associated with a connected peripheral device, without requiring the peripheral device to be accompanied by a data storage medium having the device driver stored therein, and without requiring the host computer to search for the device driver.

According to the present invention, a peripheral device connected to a host computer is cooperable with the host computer to direct the host computer to the appropriate device driver (or other device-related information), which is stored at an external location accessible to the host computer via an external data path. The host computer can then download the device driver automatically.

DETAILED DESCRIPTION

According to the present invention, a peripheral device connected to a host can provide to the host a partial pointer from which the host can produce a completed pointer. The completed pointer points to a site where the device driver for the peripheral device is located in a data network. The host computer uses the completed pointer to access the site via the data network and download the device driver.

Figures 1, 2, 3, 4:
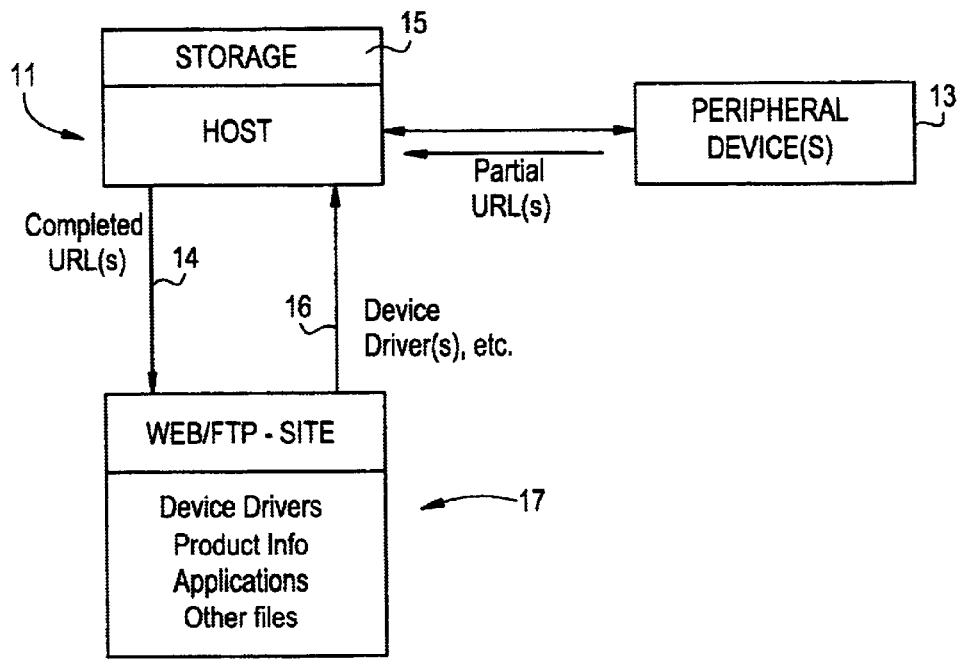
FIG. 1 diagrammatically illustrates exemplary cooperation between a host computer and a connected peripheral device to direct the host computer to a corresponding device driver according to the invention.
FIG. 2 illustrates an example of a partial URL (Uniform Resource Locator) of FIG. 1.
FIG. 3 illustrates an example of a completed URL of FIG. 1.
FIG. 4 illustrates an example of a filename that is associated with a peripheral device driver and can be produced by the host computer of FIG. 1 in response to the partial URL of FIG. 1.

FIG. 1 is a block diagram of an exemplary arrangement according to the invention. FIG. 1 illustrates a host computer 11 coupled to one or more peripheral devices at 13. The host computer can be, for example, a personal computer, an engineering workstation, or any data processing apparatus which has need for connection to and interaction with peripheral devices. The peripheral devices at 13 can be virtually any peripheral devices, for example a printer, a monitor or a PCI card. As mentioned above, the invention is particularly useful when applied to relatively mobile peripheral devices such as wireless devices, which can be easily moved about and connected to a variety of host computers.

In FIG. 1, when the host computer 11 requires a device driver for a given peripheral device, for example, when the host first communicates with a recently connected peripheral device at 13, the peripheral device communicates to the host computer 11 a partial pointer (a portion of a pointer), for example a partial URL as shown in FIG. 1. The host computer receives the partial pointer and produces therefrom a completed pointer, for example a completed URL as shown in FIG. 1. The host computer 11 can then use a suitable output 14 to apply the completed pointer to a data network that is accessible to the host and has stored at a site 17 therein the device driver associated with the peripheral device. The completed pointer points to the site where the device driver is located, so the host can download the driver automatically via an input 16 thereof.

In the example of FIG. 1, the device driver can be located at, for example, a web site that is accessible to the host computer via the Internet and is pointed to by the completed pointer (in this example the completed URL). Once the web site has been accessed by the completed URL, the device driver can be downloaded to the host computer via the Internet (not shown in FIG. 1).

As shown in FIG. 1, the completed pointer (e.g., URL) can also point, for example, to product information about the peripheral device, other applications associated with the peripheral device, or any other downloadable files associated with the peripheral device.

Also as shown in FIG. 1, in another embodiment, the completed pointer can point to an FTP (file transfer protocol) site accessible to the host via the Internet and capable of storing device drivers, product information, other applications, etc.

FIG. 2 illustrates one example of a partial URL (a portion of a URL) which can be output from one of the peripheral devices 13 to the host computer 11. The asterisk "*" in FIG. 2 represents a missing portion of the partial URL in FIG. 2, which will be provided by the host computer in order to produce a completed URL.

FIG. 3 illustrates an example of a completed URL produced by the host computer 11 in response to receiving the exemplary partial URL of FIG. 2. In the completed URL of FIG. 3, the host computer has replaced the asterisk "*" with a platform/operating system identifier, namely Win98_x86, which identifies the host computer platform as an x86 platform and the host computer operating system as Windows 98. The completed URL such as shown in FIG. 3 points to the web/FTP site of FIG. 1 where, for example, the manufacturer of the peripheral device has stored one or more of the device drivers, product information, applications and other downloadable files associated with that particular peripheral device.

Because of the platform/operating system identifier Win98_x86 in the URL of FIG. 3, the URL points to the correct drivers, applications, etc. which are intended by the peripheral device manufacturer to operate with the platform/ operating system of the host computer 11. Other forms of identification of the platform/operating system can be used, provided they are known by the manufacturer of the peripheral device so the site 17 can be set up accordingly.

FIG. 4 illustrates a filename which can be constructed by the host computer 11 from the information in the exemplary partial URL of FIG. 2. Such a filename can be constructed, for example, in the event that the device driver is not available at the site referenced by the URL of FIG. 3. Starting from the leftmost character in the partial URL of FIG. 2, the host can delete all characters up to and including the asterisk "*", and then insert "file:/a:/Win98_x86" in place of the deleted characters to produce the filename of FIG. 4. This filename can then be used by the host computer to attempt to retrieve the appropriate device driver from a storage medium accessible to the host computer (see 15 in FIG. 1), such as a floppy disk or CD-ROM provided with the peripheral device and inserted into the host.

Figure 5:
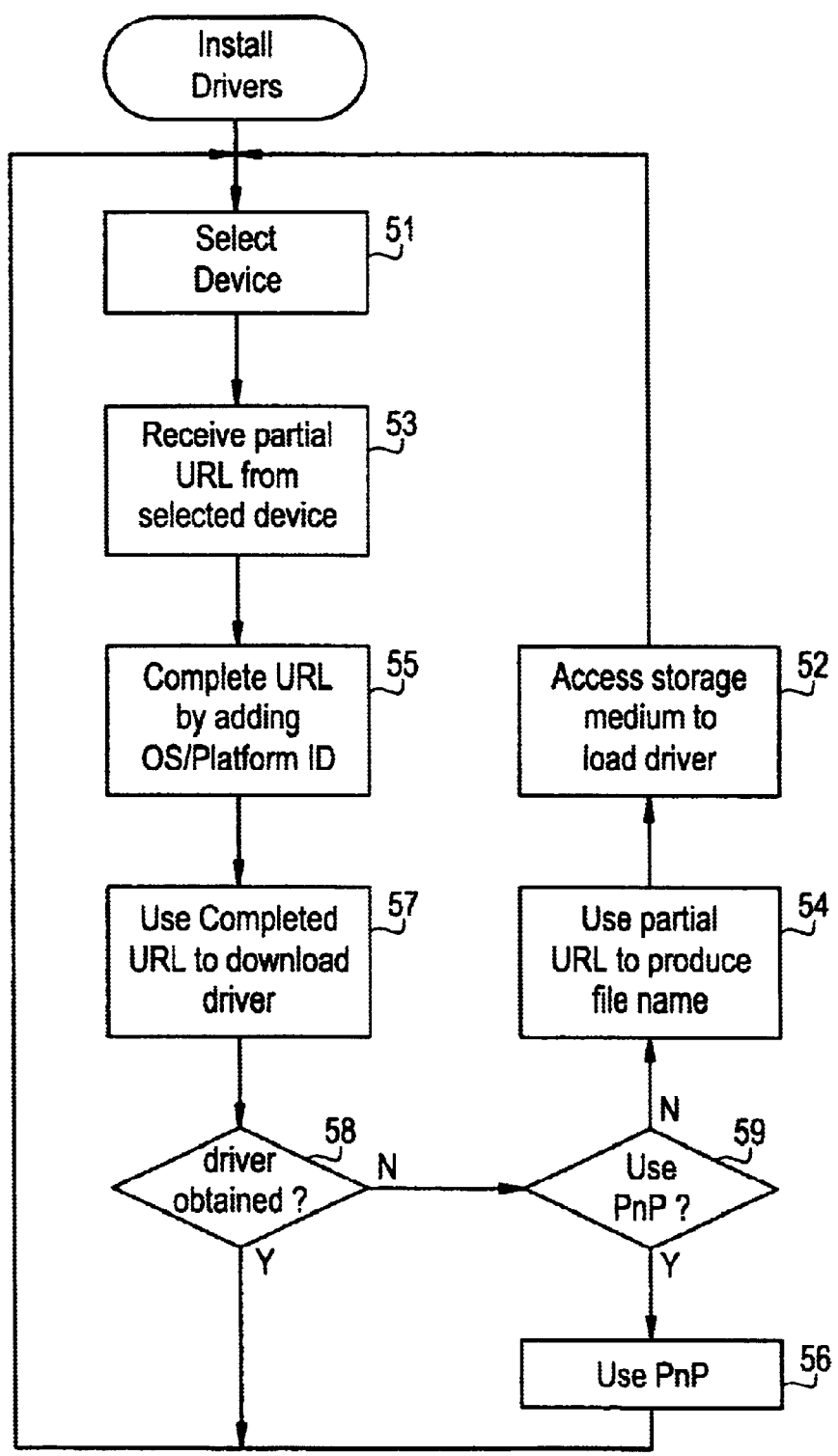
FIG. 5 illustrates exemplary operations which the host computer of FIG. 1 can perform according to the invention.

The above-described operations of the host computer in the arrangement of FIG. 1 are further understood with reference to the exemplary flow diagram of FIG. 5. When the driver is to be installed in a given peripheral drive, the host computer 11 selects that device at 51, and thereafter at 53 requests and receives from the selected peripheral device the partial pointer, for example the partial URL of FIG. 2. At 55, the host computer completes the URL by adding the operating system/platform identification information. Thereafter, at 57 the host computer uses the completed URL to download the device driver (or product information, etc.) automatically from, for example a web site or FTP site. If it is determined at 58 that the driver has been obtained, then the next device can be selected at 51.

If it is determined at 58 that the driver has not been obtained using the URL, it can be next determined at 59 whether or not to use conventional Plug-and-Play techniques to obtain the driver. If so, then conventional Plug-and-Play techniques are used at 56. Decision block 59 also provides an alternative to conventional Plug-and-Play, namely the path leading to block 54 wherein the host computer uses the partial URL to produce a filename such as discussed above and illustrated in FIG. 4. The host computer then uses the filename at 52 to access a storage medium such as a floppy disk or CD-ROM from which to load the appropriate device driver (or product information, etc.).

Figure 6:
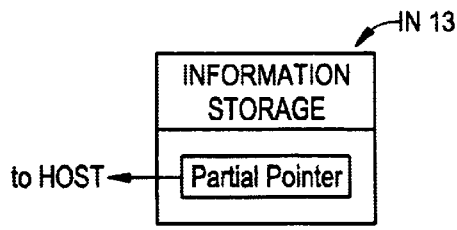
FIG. 6 illustrates a partial pointer stored in an information storage portion of a peripheral device according to the invention.

FIG. 6 illustrates pertinent portions of an exemplary embodiment of a peripheral device 13 according to the present invention. As shown in FIG. 6, the peripheral device includes an information storage portion (for example a ROM) wherein the partial pointer (for example a partial URL) is stored. The partial pointer can then be provided to the host, for example, upon initial connection/ communication with the host.

Figure 7:
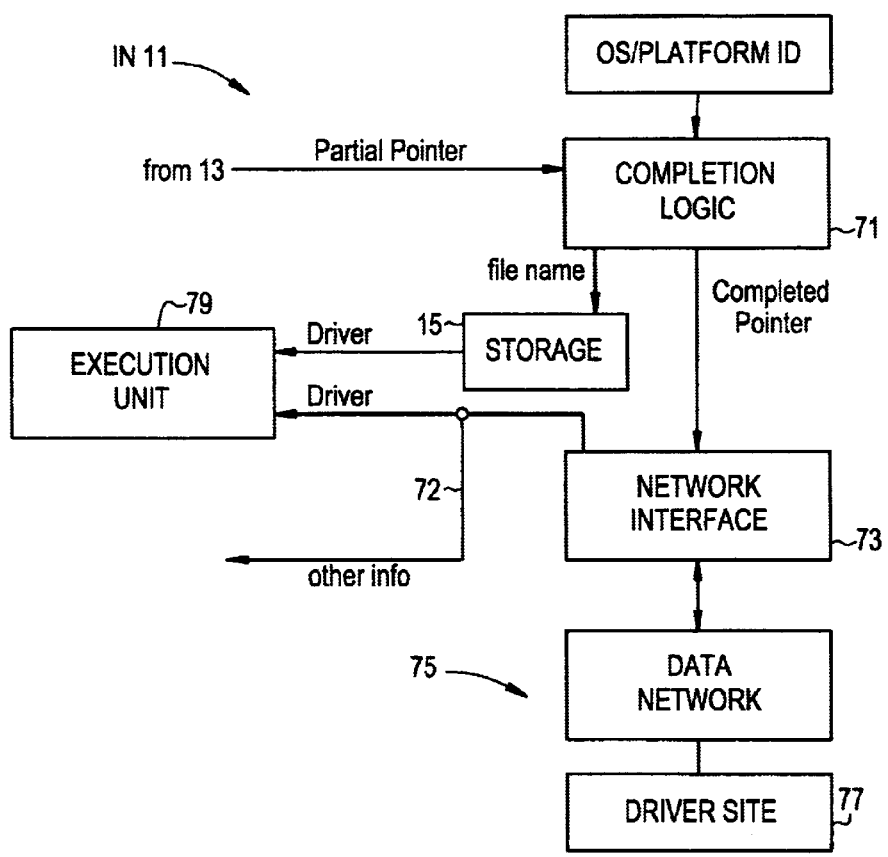
FIG. 7 diagrammatically illustrates pertinent portions of an exemplary embodiment of a host computer according to the invention.

FIG. 7 illustrates pertinent portions of an exemplary embodiment of a host computer according to the invention. The host computer of FIG. 7 includes completion logic 71 which receives as an input the partial pointer information from the peripheral device. The completion logic inserts the operating system/platform identification information (OS/ PLATFORM ID) into the partial pointer to produce a completed pointer which is output from the completion logic 71. The completion logic 71 is also selectively operable to produce a filename (such as shown in FIG. 4) from the partial pointer information. The filename can then be used to access the information storage medium at 15 and obtain therefrom a device driver, as discussed above with reference to FIG. 5.

As shown in FIG. 2, the partial pointer can include a predetermined symbol or character such as an asterisk "*", such that the completion logic 71 can find and remove the asterisk "*" from the partial pointer, and insert the operating system/platform identification information at that point in the partial pointer. In other embodiments, the completion logic can locate the insertion point by other techniques, for example by a known character offset count from the beginning or end of the partial pointer.

The completed pointer is input to a network interface 73 which interfaces the host computer to a data network 75. In the aforementioned example wherein the data network is the Internet, the network interface 73 can be, for example, a web browser. The data network 75 includes the driver site 77 (for example the web site 17 of FIG. 1) where the driver, product information, application, etc. is located. The network interface 73 applies the completed pointer to the data network 75, and the device driver from site 77 is returned automatically via the data network 75 to the network interface 73 in response to the completed pointer. The driver can then be supplied to an execution unit 79 which will execute the driver software. FIG. 7 also illustrates at 72 that the completed pointer may also point to (and be used to retrieve) other information such as product information, applications useable with the peripheral device, or other downloadable files related to the peripheral device.

Figure 8:
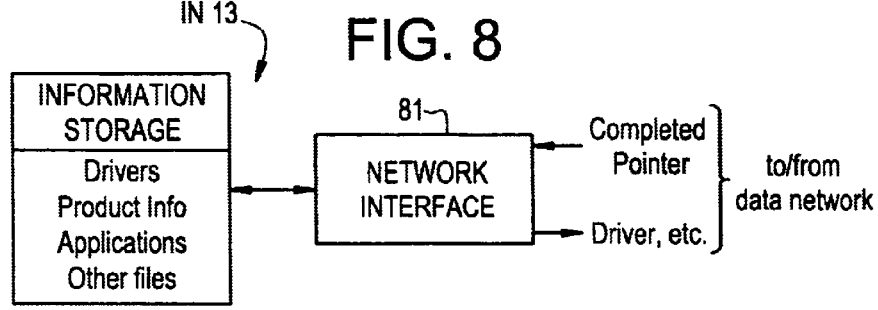
FIG. 8 diagrammatically illustrates pertinent portions of an exemplary peripheral device according to the invention.

FIG. 8 illustrates pertinent portions of another exemplary peripheral device according to the invention.

FIG. 8 illustrates that the peripheral device itself can include, in an information'storage portion (e.g., a ROM) thereof, its own device drivers, product information, applications, etc. That is, the driver site illustrated in FIGS. 1 and 7 is provided in the peripheral device itself. In this embodiment, the peripheral device includes a network interface 81 that interfaces the peripheral device to a data network. For example, if the network interface 81 supports TCP/IP and e.g. HTTP, then the host computer can utilize the Internet to retrieve the device driver, product information, applications, etc. automatically from the peripheral device itself.

Figures 9, 10, 11:
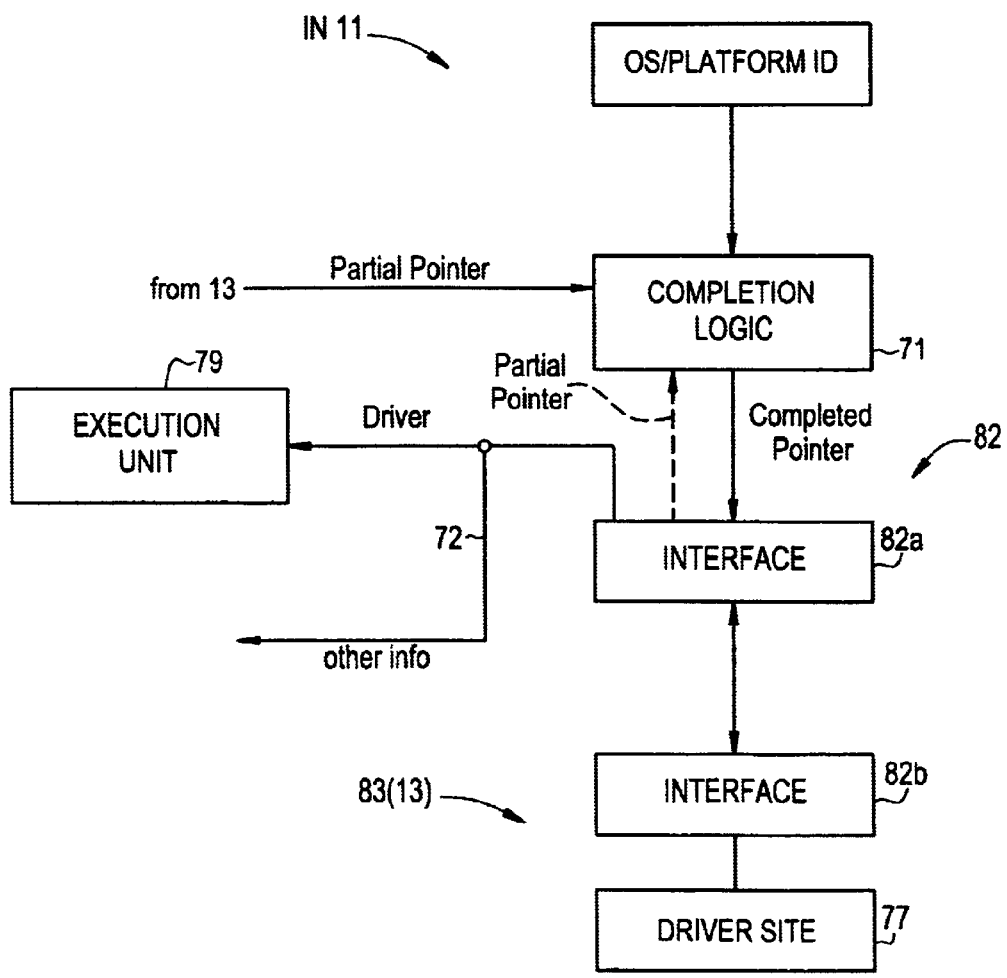
FIG. 9 illustrates another example of a partial pointer according to the invention.
FIG. 10 illustrates another example of a completed pointer according to the invention.
FIG. 11 diagrammatically illustrates pertinent portions of an exemplary embodiment of a host computer according to the invention.

FIG. 11 is similar to FIG. 7, but illustrates exemplary embodiments wherein the completed pointer can be used to access the desired peripheral device driver from an external peripheral device 83 that is accessible to the host computer via an external data path provided by any desired communication medium 82. The communication medium 82 can include interfaces 82*a* and 82*b*. The interface 82*a* of the host computer communicates with the interface 82*b* of the peripheral device 83. The communication medium 82 can be, for example, a point-to-point medium. Specific examples of the communication medium 82 include: an RF link, using a point-to-point protocol such as PPP (on top of which may run HTTP/TCP/IP); a serial cable; an infrared interface using the IrDA (Infrared Data Association) protocols; a Universal Serial Bus (USB); and a PC-Card (e.g., PCMCIA). In some embodiments (e.g., the RF link embodiment), internet protocols or other desired protocols may run on top of the interfaces 82*a* and 82*b*.

Additionally, a communication medium such as shown at 82 can be used by a peripheral device 13 of FIG. 1, 7 or 11 to communicate the partial pointer to the host computer. Moreover, in some embodiments wherein the driver site is provided in the same peripheral device 13 that provides the partial pointer, the communication medium 82 can be used to communicate both the partial pointer and the device driver from the peripheral device 13 to the host computer (such embodiments are designated by the use of reference character "83(13)" and the broken line in FIG. 11).

Examples of the peripheral devices 13 or 83 in FIG. 1, 7 or 11 include a cellular telephone, a printer, a camera, a speaker, a laptop PC or any information storage device.

FIG. 9 illustrates an example of a partial URL which can be provided to a host computer by a peripheral device, and which is intended to permit the host computer to access product information about the peripheral device. Again, the asterisk "*" is used to identify the insertion point for the platform/operating system identifier.

FIG. 10 illustrates a completed URL which can be produced by the host computer in response to receiving the partial URL of FIG. 9. In the example of FIG. 10, platform/operating system identifier Win2000_x86 indicates that the operating system is Windows 2000 and the platform is an x86 platform. Furthermore, in the example of FIGS. 9 and 10, the peripheral device is an Ericsson mobile telephone, model no. GH198.

Although exemplary embodiments of the present invention have been described above in detail, this does not limit the scope of the invention, which can be practiced in a variety of embodiments.

What is claimed is:

1. A method for a host computer to access device information corresponding to a peripheral device that is to be used in cooperation with the host computer, comprising:

the peripheral device providing to the host computer a first portion of a pointer, the first portion of the pointer representative of a peripheral device specific part of the pointer;

the host computer automatically producing, in response to the first portion of the pointer, a second portion of the pointer that points to a location from which the device information can be automatically downloaded to the host computer, the second portion of the pointer representative of a host computer specific part of the pointer;

the host computer combining the first portion of the pointer and the second portion of the pointer, the combining step including the host computer inserting the second portion of the pointer at a predetermined location in the first portion of the pointer; and the host computer using the pointer to download automatically the device information.

2. The method of claim 1, wherein the first portion of the pointer includes a predetermined symbol at the predetermined location thereof.

3. The method of claim 2, wherein the combining step includes the host computer detecting and removing the predetermined symbol from the first portion of the pointer.

4. The method of claim 1, wherein the second portion of the pointer includes information indicative of a computing platform of the host computer and an operating system of the host computer.

5. The method of claim 1, wherein the using step includes the host computer applying the pointer to a data network and downloading the device information from a storage site accessible to the data network.

6. The method of claim 5, wherein the downloading step includes downloading the device information from the peripheral device.

7. The method of claim 5, wherein the downloading step includes downloading the device information from a web site.

8. The method of claim 1, wherein the device information includes one of a device driver associated with the peripheral device, product information about the peripheral device, and an application associated with the peripheral device.

9. The method of claim 1, wherein the pointer comprises a URL.

10. A host computing apparatus connectable to a peripheral device for cooperation therewith, the apparatus comprising:

an input for receiving from a peripheral device, pointer information comprising a first portion of a pointer, the first portion of the pointer representative of a peripheral device specific part of the pointer;

logic coupled to the input and responsive to the first portion of the pointer for automatically producing a second portion of the pointer and combining the first and second portions to provide a complete pointer which points to an external storage location that is accessible via an external data path and has stored therein device information that the host computing apparatus can use to interface with the peripheral device; wherein the second portion of the pointer is representative of a host computing apparatus specific part of the pointer;

wherein the combining of the first and second portions include inserting the second portion into the first portion at a predetermined location in the first portion;

an output coupled to the logic for applying the pointer to the external data path; and an input for receiving the device information from the external data path.

11. The apparatus of claim 10, wherein the device information includes one of a device driver associated with the peripheral device, product information about the peripheral device, and an application associated with the peripheral device.

12. The apparatus of claim 10, wherein the logic is selectively operable to produce from the pointer information a file name for use in accessing a storage medium in the host apparatus to retrieve therefrom the device information.

13. The apparatus of claim 10, wherein the pointer comprises a URL.

14. The apparatus of claim 10, wherein the second portion of the pointer includes information indicative of a computing platform and an operating system of the host computing apparatus.

15. The apparatus of claim 10, wherein the input for receiving pointer information is the same input as the input for receiving device information.

16. The apparatus of claim 10, wherein the input for receiving pointer information is separate from the input for receiving device information.

* * * * *